US012181587B2

(12) United States Patent
Saunders et al.

(10) Patent No.: US 12,181,587 B2
(45) Date of Patent: Dec. 31, 2024

(54) SYSTEMS AND METHODS FOR USING A SATELLITE FOR DETECTING SPOOF ATTEMPTS AND GEOLOCATING SPOOFERS

(71) Applicant: Horizon Technologies Space Limited, Reading (GB)

(72) Inventors: David Saunders, Reading (GB); Gary Goodrum, Colo de Caza, CA (US); John Beckner, Reading (GB)

(73) Assignee: Horizon Technologies Space Limited, Reading (GB)

( * ) Notice: Subject to any disclaimer, the term of this patent is extended or adjusted under 35 U.S.C. 154(b) by 0 days.

(21) Appl. No.: 17/587,461

(22) Filed: Jan. 28, 2022

(65) Prior Publication Data

US 2022/0397682 A1 Dec. 15, 2022

Related U.S. Application Data

(60) Provisional application No. 63/143,529, filed on Jan. 29, 2021.

(51) Int. Cl.
*G01S 19/21* (2010.01)
*G01S 19/06* (2010.01)

(52) U.S. Cl.
CPC ............ *G01S 19/215* (2013.01); *G01S 19/06* (2013.01)

(58) Field of Classification Search
CPC ........ G01S 19/215; G01S 5/0249; G01S 5/14; G01S 5/02213; G01S 5/145
See application file for complete search history.

(56) References Cited

U.S. PATENT DOCUMENTS

| 5,936,571 | A | * | 8/1999 | Desjardins | ................ G01S 5/06 701/469 |
| 7,912,643 | B1 | * | 3/2011 | Bean | ..................... G01S 19/215 342/357.29 |
| 8,446,310 | B2 | * | 5/2013 | Law | ......................... H04K 3/22 342/16 |
| 10,254,411 | B2 | * | 4/2019 | Littlefield | ............... G01S 19/21 |
| 11,444,027 | B2 | * | 9/2022 | Rothschild | ............... B64G 1/10 |

OTHER PUBLICATIONS

Murrian, Matthew J et al. "GNSS Interference Monitoring from Low Earth Orbit." arXiv.org (2020): n. pag. Print. (Year: 2020).*

* cited by examiner

*Primary Examiner* — Cassi J Galt
(74) *Attorney, Agent, or Firm* — Jones Day

(57) ABSTRACT

Systems and methods for detecting spoofing attempts are disclosed. In one embodiment, a ground station system for detecting a Global Navigation Satellite System (GNSS) spoof signal includes a receiver configured to receive data collected by a detection satellite that (1) is on a first orbit that is lower than a second orbit used by a GNSS satellite and (2) includes: a first antenna positioned to receive signals originating from a planetary surface, and a second antenna positioned to receive signals originating from the GNSS satellite on a higher orbit than the first orbit of the detection satellite. The ground station further includes one or more processors configured to calculate, using the time of arrival of the signal received at the first antenna and the position of the detection satellite determined based on the signal received at the second antenna, a geolocation of a source of the signal originating from a planetary surface.

14 Claims, 7 Drawing Sheets

SYSTEMS AND METHODS FOR USING A SATELLITE FOR DETECTING SPOOF ATTEMPTS AND GEOLOCATING SPOOFERS

CROSS REFERENCE TO RELATED APPLICATION

This application claims the benefit of priority from U.S. Provisional Application No. 63/143,529, filed Jan. 29, 2021. The foregoing related application, in its entirety, is incorporated herein by reference.

TECHNICAL FIELD

The following disclosure relates to systems and methods for detecting ground-based spoofing signals using a non-geostationary satellite and determining the location of the spoofing signals.

BACKGROUND

In the context of satellite navigation systems (e.g., Global Positioning System), a spoofer may attempt to deceive such systems (i.e., "spoof") by transmitting fake signals that resemble the legitimate signals. One way to generate fake signals is to record the legitimate signals and rebroadcast them at different times and/or locations. A conventional technique for detecting spoofing works by programming satellite navigation systems (e.g., GPS receiver) to ignore the fake signal.

SUMMARY

The present disclosure is directed to centralized systems and methods for detecting spoofing attempts. In some embodiments, the disclosed techniques use a single non-geostationary satellite, such as a CubeSat, to detect spoofing signals transmitted from the ground. In some embodiments, the disclosed techniques are further capable of geolocating the source of such signals.

In one embodiment, a non-geostationary satellite includes at least one data collection module in communication with a signal processing module and that receives signals by at least one antenna, wherein:
  the at least one antenna is configured to receive signals transmitted from the ground and in a frequency range for signals that are in the format of a satellite navigation signal;
  the at least one data collection module is configured to tune to a frequency range and filter for distinct frequencies that are used by satellite navigation systems, in order to detect and record signals of a satellite navigation system; and
  the at least one signal processing module is configured to obtain and record, from the signals received at the at least one antenna, at least one repetitive part, such as pulses or the like, and assign a time of arrival and a location of the repetitive part of the recorded signals, wherein the location and the time of arrival correspond to the time and location of the satellite when repetitive part of the recorded signal was received.

When the at least one antenna on a satellite, configured to receive ground-based signals, detects signals formatted as global satellite navigation system (GNSS) signals, it can be determined that spoofing is occurring. Legitimate GNSS signals are known to be emitted from satellites of satellite navigation systems, such as GPS, GLONASS, Galileo or Baidou. Versions of these respective signals received at the satellite from a source at the ground cannot be legitimate. By fine tuning the satellite antenna to a distinct frequency range where the respective signal is to be expected and by filtering for distinct frequencies, a faster, less extensive signal recovery is possible, as noise arising from other frequencies that are not of interest need not be taken into account. It also can be advantageous that the signals of interest may be detected and recovered more easily when the tuner on the satellite for receiving a signal is precisely preset. Further, location information can be obtained by the use of a satellite that records the signals from the same source at different positions on its orbit.

In an embodiment, the data collection module comprises at least one satellite navigation receiver configured to detect a repetitive signal believed to be a spoofing signal, and to provide location and time information for determining the time of arrival and the satellite's location when the repetitive parts of the received signals are detected. The at least one satellite navigation receiver is connected to at least one reference antenna, which is configured to detect signals from emitted from ground.

Further, the data collection module of the non-geostationary satellite is additionally configured to receive via the at least one antenna a number of other ground-based signals, including radar signals, AIS signals, satellite phone signals and/or other radio frequency signals, and to provide location and time information for determining the time of arrival and the satellite's location corresponding to when the satellite detected the repetitive parts of these other ground-based signals. The at least one signal processing module is further configured to obtain a repetitive part of the other ground-based signals and to assign a time of arrival and a location to each period of the repetitive part of the other ground-based signals, whereas the location and the time of arrival correspond to the time and location of the satellite when the period of the repetitive part of the recorded signal was received.

In one embodiment, the data collection module comprises at least four antennas: a radio antenna configured to receive signals related to AIS, an X band antenna and an S band antenna for the reception of radar signals, and an L band antenna for the reception of signals from satellite navigation systems. The L band antenna can be further configured to receive also satellite phone signals. Accordingly, high pass, low pass and band pass filters of the L band antenna can be adjusted. The same can also applied to the AIS, X band, and S band antenna to reduce noise from sources that are not of relevance.

In another embodiment, two separate L band antennas for the reception of signals from satellite navigation systems and sat phones can be used. This may be advantageous because the filters for these antennas can be distinctively adapted for reception of either signals from satellite navigation systems or sat phones.

In one embodiment, upon receiving the arrival times and position information data, and determining the repetitive part of the received signal, the signal processing module is configured to determine a location of origin of the signal. The signal processing module uses the received information regarding the signals of a satellite navigation system to select a plurality of candidate locations to determine the location of origin of the signal of a satellite navigation system received at the at least one antenna. The signal processing unit also determines, for each candidate location and based on the arrival times and the position information, an error value representing the proximity between a candidate location and the location of the earth-based vessel or spoofer. The signal processing unit selects, from the plurality of candidate locations associated with a plurality of error values, one candidate location having a lowest error value, which determines the location of the earth-based vessel or spoofer.

In another embodiment, the signals collected by the data collection module are transferred to a ground station, where a signal processing unit performs the determination of the location of origin as stated above.

The non-geostationary satellite may orbit earth in a non-geostationary path, such as in a low-earth orbit (LEO), a medium-earth orbit (MEO), a high-earth orbit (HEO), or a Molniya orbit.

In a preferred embodiment, the orbit of the non-geostationary satellite is located below the orbits of the satellites of satellite navigation systems.

In one embodiment, at the least one antenna is pointing on nadir or the center of the earth.

In one embodiment, at least one reference antenna is located on a surface of the non-geostationary satellite facing away from ground, while the at least one antenna is located on a surface of the non-geostationary satellite, which faces to the ground. Thus, the satellite body itself can provide a shielding of the reference antenna, in order to avoid that the reference antenna itself catches any ground based satellite navigation system related signal, i.e. a spoofing signal.

Vessels, such as for commercial shipping, are equipped with several systems for aiding navigation, such as AIS and radar. The operators of such vessels also may use one or more satellite phones. When active, these systems all emit electromagnetic signals in distinct frequency ranges, which can be detected by a satellite antenna.

In another embodiment, the non-geostationary satellite provides the capability, for example, in addition to the spoofing detection capability as described above, for the geolocation of vessels (e.g., ships). The non-geostationary satellite comprises a data collection module that is configured to receive radar, AIS, sat phone and satellite navigation systems signals. These signals can be detected by at least one antenna on the satellite configured to receive said signals from the ground, wherein the geolocation of each source emitting said signals is determined based on the radar, AIS or sat phone signals received by the data collection module by recording said signals at least four different locations of the non-geostationary satellite and by determining and assigning the times of arrival and location of the satellite for each received signal.

The data collection module can further include mapping logic, which comprises a mapping function, wherein this mapping function assigns location and/or frequencies of the spot beams of sat phone services in dependency of the orbit of the non-geostationary satellite. Further, the mapping logic is configured to provide the relevant frequencies and/or location of at least one sat phone service's spot beam that is available at the current position of the satellite, so that the data collection unit can monitor signals of this at least one available beam spot of the at least sat phone service. This enables an efficient monitoring of sat phone signals in a global perspective. Still further, the data collection module can be configured to monitor and receive sat phone signals from up to 19 beam spots. This can be achieved by a respectively configured receiver or SDR, with sufficient channels. In another embodiment this can also be achieved by multiple receivers and/or a consecutive monitoring of different channels.

The non-geostationary satellite can further comprise at least one signal processing module that is configured to obtain at least one repetitive part of at least one recorded signal type, as for example, radar or sat phone signals. Further, the at least one data processing module is configured to assign a time of arrival and a location to the repetitive part obtained from the received signals, wherein the location and the time of arrival correspond to the time and location of the satellite when the respective repetitive part of the at least one signal type was received.

The signal processing module can calculate the location of the source of one or more recorded signal types. Upon reception of the arrival times and position information, as well as the determination of the repetitive part of the received signal and/or received other ground-based signal, the signal processing module can be configured to determine a location of origin of the signals. The signal processing module uses at least the received information regarding the signals of a satellite navigation system to select a plurality of candidate locations to determine the location of origin of the signal of a satellite navigation system received at the at least one antenna. The signal processing unit also determines, for each candidate location and based on the arrival times and the position information, an error value representing the proximity between a candidate location and the location of the earth-based vessel or spoofer. The signal processing unit selects, from the plurality of candidate locations associated with a plurality of error values, one candidate location having a lowest error value, which determines the location of the earth-based vessel or spoofer.

In one embodiment, the signal processing module comprises logic for mapping the received sat phone signals of one or more sat phones to at least one other received signal, as for example, radar and/or AIS signals, by correlating the determined locations and/or other information obtained from the received signals. Such information that is provided by AIS and/or the unique radar emittance signature can be referred to as a radar fingerprint of a sea vessel, which also can be recorded by the data collection module as a reference to previous mapping information.

In one embodiment the data collection module comprises an additional channel, which is configured to monitor the "handshaking" of sat phones. The handshaking at the beginning of a sat phone call or data transmission usually comprises location information that can be extracted therefrom.

In other aspects, the above-described methods can be embodied in the form of processor-executable code and stored in a computer-readable program medium.

A device that is configured or operable to perform the above-described methods is also disclosed.

In one embodiment, a ground station system for detecting a Global Navigation Satellite System (GNSS) spoof signal includes a receiver configured to receive data collected by a detection satellite, wherein the detection satellite is on a first orbit that is lower than a second orbit used by a GNSS satellite. The detection satellite includes: a first antenna positioned to receive signals originating from a planetary surface, wherein the first antenna is capable of receiving signals in a frequency range used by the GNSS spoof signal, a second antenna positioned to receive signals originating from the GNSS satellite on a higher orbit than the first orbit of the detection satellite, wherein the second antenna is capable of receiving signals in a frequency range used by the GNSS satellite, and one or more processors configured to: receive a first GNSS signal emitted from the surface via the first antenna, receive a second GNSS signal emitted by the GNSS satellite via the second antenna, determine, based on the second GNSS signal, a position of the detection satellite when the first GNSS signal is received at the detection satellite, and determine a time of arrival associated with the first GNSS signal. The detection satellite further includes a transmitter configured to transmit, to the ground station system, the position of the detection satellite and the time of arrival. The ground station system further includes one or more processors configured to calculate, using the time of arrival and the position of the detection satellite included in the collected data, a geolocation of a source of the first GNSS signal received at the first antenna of the detection satellite.

In some embodiments, the first antenna is further capable of receiving signals in at least one frequency range used by a non-GNSS signal. In some embodiments, the processors included in the ground station system are further configured to receive the non-GNSS signal and determine a signature associated with the non-GNSS signal. In some embodiments, the processors included in the ground station system are further configured to identify a signal source associated with the signature and using the identified signal source to determine an identity associated with the source of the non-GNSS signal. In some embodiments, the non-GNSS signal is a radar signal, satellite phone service signal, or an automatic identification system (AIS) signal. In some embodiments, the processors included in the ground station are further configured to identify a repetitive part of the first GNSS signal, and the data collected by the detection satellite includes a recording of the repetitive part. In some embodiments, a body of the detection satellite is interposed between the first and second antenna, and the body is configured to shield the second antenna from signals originating from the planetary surface. In some embodiments, the processors included in the detection satellite are further configured to receive the non-GNSS signal and determine a signature associated with the non-GNSS signal.

In another embodiment, a method for detecting a Global Navigation Satellite System (GNSS) spoof signal by a ground station system includes receiving, using a receiver, data collected by a detection satellite, wherein the detection satellite is on a first orbit that is lower than a second orbit used by a GNSS satellite. The detection satellite includes: a first antenna positioned to receive signals originating from a planetary surface, wherein the first antenna is capable of receiving signals in a frequency range used by the GNSS spoof signal, a second antenna positioned to receive signals originating from the GNSS satellite on a higher orbit than the first orbit of the detection satellite, wherein the second antenna is capable of receiving signals in a frequency range used by the GNSS satellite, and one or more processors configured to: receive a first GNSS signal emitted from the surface via the first antenna, receive a second GNSS signal emitted by the GNSS satellite via the second antenna, determine, based on the second GNSS signal, a position of the detection satellite when the first GNSS signal is received at the detection satellite, and determine a time of arrival associated with the first GNSS signal. The detection satellite further includes a transmitter configured to transmit, to the ground station system, the position of the detection satellite and the time of arrival. The method further includes calculating, using the time of arrival and the position of the detection satellite included in the collected data, a geolocation of a source of the first GNSS signal received at the first antenna of the detection satellite.

In some embodiments, the first antenna is further capable of receiving signals in at least one frequency range used by a non-GNSS signal. In some embodiments, the method further includes receiving the non-GNSS signal and determine a signature associated with the non-GNSS signal. In some embodiments, the method further includes identifying a signal source associated with the signature and using the identified signal source to determine an identity associated with the source of the non-GNSS signal. In some embodiments, the non-GNSS signal is a radar signal, satellite phone service signal, or an automatic identification system (AIS) signal. In some embodiments, the method further includes identifying a repetitive part of the first GNSS signal, and the data collected by the detection satellite includes a recording of the repetitive part. In some embodiments, a body of the detection satellite is interposed between the first and second antenna, and the body is configured to shield the second antenna from signals originating from the planetary surface. In some embodiments, the processors included in the detection satellite are further configured to receive the non-GNSS signal and determine a signature associated with the non-GNSS signal.

In yet another embodiment, a non-transitory computer-readable storage medium comprising instructions which, when executed by a computer, cause the computer to perform a method for detecting a Global Navigation Satellite System (GNSS) spoof signal by a ground station. The method includes receiving, using a receiver, data collected by a detection satellite, wherein the detection satellite is on a first orbit that is lower than a second orbit used by a GNSS satellite. The detection satellite includes: a first antenna positioned to receive signals originating from a planetary surface, wherein the first antenna is capable of receiving signals in a frequency range used by the GNSS spoof signal, a second antenna positioned to receive signals originating from the GNSS satellite on a higher orbit than the first orbit of the detection satellite, wherein the second antenna is capable of receiving signals in a frequency range used by the GNSS satellite, and one or more processors configured to: receive a first GNSS signal emitted from the surface via the first antenna, receive a second GNSS signal emitted by the GNSS satellite via the second antenna, determine, based on the second GNSS signal, a position of the detection satellite when the first GNSS signal is received at the detection satellite, and determine a time of arrival associated with the first GNSS signal. The detection satellite further includes a transmitter configured to transmit, to the ground station system, the position of the detection satellite and the time of arrival. The method further includes calculating, using the time of arrival and the position of the detection satellite included in the collected data, a geolocation of a source of the first GNSS signal received at the first antenna of the detection satellite.

In some embodiments, the first antenna is further capable of receiving signals in at least one frequency range used by a non-GNSS signal. In some embodiments, the method further includes receiving the non-GNSS signal and determine a signature associated with the non-GNSS signal. In some embodiments, the method further includes identifying a signal source associated with the signature and using the identified signal source to determine an identity associated with the source of the non-GNSS signal. In some embodiments, the non-GNSS signal is a radar signal, satellite phone service signal, or an automatic identification system (AIS) signal. In some embodiments, the method further includes identifying a repetitive part of the first GNSS signal, and the data collected by the detection satellite includes a recording of the repetitive part. In some embodiments, a body of the detection satellite is interposed between the first and second antenna, and the body is configured to shield the second antenna from signals originating from the planetary surface. In some embodiments, the processors included in the detection satellite are further configured to receive the non-GNSS signal and determine a signature associated with the non-GNSS signal.

In another embodiment, a detection satellite on a first orbit that is lower than a second orbit used by a GNSS satellite includes a first antenna positioned to receive signals originating from a planetary surface, wherein the first antenna is capable of receiving signals in a frequency range used by a GNSS spoof signal, and a second antenna positioned to receive signals originating from the GNSS satellite on a higher orbit than the first orbit of the detection satellite, wherein the second antenna is capable of receiving signals in a frequency range used by the GNSS satellite. The detection satellite further includes one or more processors configured to: receive a first GNSS signal emitted from the surface via the first antenna, receive a second GNSS signal emitted by the GNSS satellite via the second antenna, determine, based on the second GNSS signal, a position of the detection satellite when the first GNSS signal is received at the detection satellite, determine a time of arrival associated with the first GNSS signal, and transmit data collected by the detection satellite to a ground station system. The ground station system includes one or more processors configured to calculate, using the time of arrival and the position of the detection satellite included in the collected data, a geolocation of a source of the first GNSS signal received at the first antenna of the detection satellite.

In some embodiments, the first antenna is further capable of receiving signals in at least one frequency range used by a non-GNSS signal. In some embodiments, the processors included in the ground station system are further configured to receive the non-GNSS signal and determine a signature associated with the non-GNSS signal. In some embodiments, the processors included in the ground station system are further configured to identify a signal source associated with the signature and using the identified signal source to determine an identity associated with the source of the non-GNSS signal. In some embodiments, the non-GNSS signal is a radar signal, satellite phone service signal, or an automatic identification system (AIS) signal. In some embodiments, the processors included in the ground station are further configured to identify a repetitive part of the first GNSS signal, and the data collected by the detection satellite includes a recording of the repetitive part. In some embodiments, a body of the detection satellite is interposed between the first and second antenna, and the body is configured to shield the second antenna from signals originating from the planetary surface. In some embodiments, the processors included in the detection satellite are further configured to receive the non-GNSS signal and determine a signature associated with the non-GNSS signal.

The above and other aspects and their implementations are described in greater detail in the drawings, the descriptions, and the claims.

DETAILED DESCRIPTION

Figure 1:
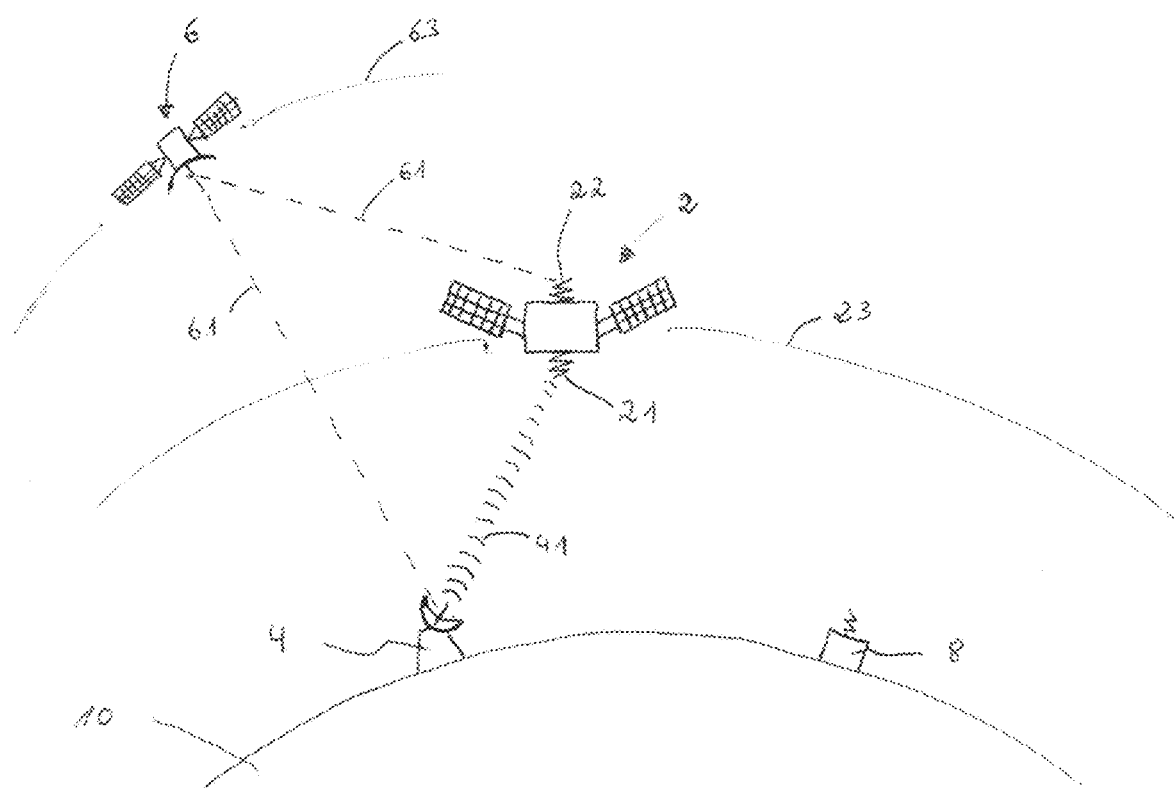
FIG. 1 is an example of a spoofing detection system based on a non-geostationary satellite.

The following description is merely exemplary in nature and is not intended to limit the present disclosure, application, or uses. It should be understood that throughout the drawings, corresponding reference numerals indicate like or corresponding parts and features.

The disclosed systems and methods are capable of using a satellite to detect spoofing attempts. In some embodiments, the systems and methods are further capable of determine the geolocation of the source of spoofing signal using the satellite. In some embodiments, the techniques enable passive detection of signals transmitted by a moving vessel or a stationary station. The disclosed systems and methods may be implemented, for example, on a vehicle operating in an earth orbit, such as a non-geostationary satellite. Such a satellite may be configured to detect signals (e.g., spoofing signals) transmitted from a vessel (e.g., cargo ship) or a ground station.

The non-geostationary satellite may orbit the earth in a non-geostationary orbit, such as in a LEO, a MEO, a HEO, or a Molniya orbit. Based on the signals detected by the satellite, a signal processing unit can use the disclosed techniques to determine the geolocation of an earth-based spoofer or vessel. The signal processing unit can be located on the satellite, or on a remote platform which may be moving (e.g., aircraft) or stationary (e.g., on the earth). Thus, a single satellite can use the technologies described herein to perform measurements that in turn are used by a signal processing unit to determine the geolocation of an earth-based spoofer or vessel. LEO satellites can operate at an altitude from about 100 miles to approximately 1,240 miles above the earth's surface. LEO has an orbit with period of approximately less than 128 minutes. LEO may be an elliptical orbit or a circular orbit. For a circular orbit, an LEO may have a maximum altitude of approximately 1269 miles and a minimum altitude of approximately 124 miles. Since a LEO satellite moves at relatively fast speeds over the ground (e.g., approximately 14,430 mph to 17,450 mph for a circular orbit), multiple measurements can be taken by the same LEO satellite from different locations faster than what is possible using an aircraft-mounted conventional measurement system. The speed of the LEO (and similarly MEO, HEO, or Molniya orbit) satellite can be considered significantly faster when compared to a speed of a moving vessel, and of course, a stationary earth-based spoofer.

As an example, the at least one data collection module can include at least one antenna and corresponding receiver, such as an SDR, with wide-spectrum or bandwidth capability that covers the frequency range/bandwidth of satellite navigation systems.

Further, the wide spectrum capability allows, beside the operation of satellite navigation system signals, the detection of signals operating at other frequencies from other signal sources Further, incorporating a variable narrow bandpass filter can enable the system to discriminate the signal of interest from other signal sources on nearby frequencies and/or to measure an angle-of arrival to obtain bearings to locate the transmitter.

The bandwidth covered by the data collection module on the non-geostationary satellite with its at least one antenna and reference antenna can be designed to receive signals transmitted within a frequency spectrum that ranges from approximately 1.5 MHz to approximately 50 GHz.

FIG. 1 illustrates an example spoofing detection system that includes satellite 2 in an orbit 23 around a planet. The satellite comprises one antenna 21 and one reference antenna 22. The at least one antenna 21 is pointed towards the planetary surface 10 while the reference antenna 22 is pointed towards space (i.e., away from surface 10). As satellite 2 moves along orbit 23, it is configured to detect GPS signals, for example, by monitoring radio signals in the L1-band range. GPS, like other global navigation satellite systems (GNSS), transmits at several frequency ranges. Thus, spoofing GPS signals typically require a spoofer to transmit in several different frequency ranges. But, for the purpose of detecting spoofs, it is typically sufficient to monitor only one of the known GPS frequency ranges/bands (though multiple frequency ranges/bands can be monitored in some embodiments).

In the example of FIG. 1, a spoofer 4 located on the planetary surface 10 is emitting a signal that spoofs (i.e., imitate) legitimate signals like the signals that are being broadcast by GPS satellite 6. For example, spoofer 4 may record the legitimate GPS signal 61 emitted from satellite 6 and re-emit/rebroadcast the recorded signal with some changes to the original signal, such as but not limited to phase shifting and/or general retiming. In many situations, spoofer 4 may apply the changes to the signals that are re-emitted/rebroadcasted in all known GPS signal ranges, such as the L1, L2 and L5 band. The re-emitted signal 41 originating from surface 10 can be detected by the non-geostationary satellite 2 through antenna 21 that is pointed towards surface 10.

In some embodiments, satellite 2 may include a software defined radio (SDR) that is connected to antenna 21. To detect signal 41, SDR may be configured to tune to frequency bands of a GNSS system (i.e., L1-band for GPS). Alternatively, or additionally, satellite 2 may include a hardware-based system that is connected to antenna 21 and configured to tune to frequency bands of a GNSS system, such as L1-band for GPS.

Antenna 22, which faces away from surface 10, is configured to record legitimate signal 61 emitted by the GNSS satellite 6. This is possible since the orbit 23 of the non-geostationary satellite 2 is closer to surface 10 than the orbit 63 of the GNSS satellite 6. That is, satellite 2 is on a lower orbit than the GNSS satellite 6. The reference antenna 22 can also detect signals from GNSS satellites other than satellite 6 to determine a position of satellite 2.

When the spoofing signal 41 is detected at the antenna 21, a data collection module (explained below with respect to FIG. 4) records at least a repetitive portion of spoofing signal 41. (In some embodiments, the data collection module may isolate the repetitive portion from the recording.) This could be, for example, the re-emitted 1-PPS signal of the L1-band of GPS. For a pulse or a cycle of the repetitive portion, (1) a time of arrival and (2) the location of the non-geostationary satellite 2 when the signal was received or recorded are recorded and associated with the pulse/cycle.

To distinguish spoofed signals from noise, one or more thresholds can be applied. If a detected signal exceeds the one or more thresholds, it will be further processed and/or saved. These thresholds may be different depending on the type of signal to be detected (e.g., dependent on the frequency or signals type or with regard to the evaluation/processing step in which they are applied). The thresholds may be applied prior to recoding of the detected signal in its raw format and/or during preprocessing, such as filtering and amplification.

In some embodiments, the reference antenna is used to determine the time of arrival and the position of the satellite when the signal was received. As discussed above, the reference antenna is pointing away from the surface. Accordingly, it cannot detect non-legitimate/spoofing GNSS signals 61 because those signals originate from the surface. In contrast, the reference antenna can detect legitimate signals that are emitted from GNSS satellites 6 because those signals originate from a higher orbit than the orbit of the non-geostationary satellite 2. Further, the reference antenna may be connected to a GNSS receiver. With this receiver the exact position of the non-geostationary satellite can be obtained based on the signals received from GNSS satellite 6 and other GNSS satellites. Moreover, the clock of the non-geostationary satellite 2 or the data collection module, which is used to determine the time of arrival, can be synchronized with a GNSS satellite. Synchronizing the clock improves the precision of the location of satellite 2 and the time of arrival for signals (e.g., signals 61) calculated by satellite 2.

In FIG. 1, the non-geostationary satellite 2 transmits the data containing the repetitive parts of signals and the associated times of arrival and the satellite position to a ground station 8. For example, satellite 2 may transmit such data (in a single batch or multiple batches) while satellite 2 is orbiting over ground station 8. The data comprises the repetitive parts of the signal with the associated times of arrival and positions of the non-geostationary satellite 2. On the ground station the collected data is further processed to geolocate the spoofer on the ground 10. In some embodiments, the geolocation is performed by a signal processing module included in the non-geostationary satellite 2. Subsequently, the determined geolocation of a spoofer are transmitted to the ground station by satellite 2.

In FIG. 1, an example antenna configuration of the non-geostationary satellite, which enables simultaneous recording of legitimate GPS signals and the spoofing signals without interference, is shown. The reference antenna 22 is positioned on one surface of the non-geostationary satellite 2, which is facing away from the ground 10. The reference antenna 22 in some embodiments is a directional antenna and thus cannot detect the spoofing signals that originate from the surface. By this positioning of the reference antenna 22, its beam width is configured to receive signals from space. In some embodiments, the body of the non-geostationary satellite 2 may act as shield (e.g., by using material or shape that significantly attenuate signals from the ground) for the reference antenna 22 against signals that originate from the surface. The same principle applies also to the at least one antenna 21. This antenna is located on the surface of the non-geostationary satellites 2, which faces towards the ground 10. In some embodiments, antenna 21 is a directional antenna and thus it can detect non-legitimate GNSS like signals, such as spoofing signals, which are emitted from the ground, for example by the spoofer 4. Correspondingly, the beam width of the at least one antenna 21 may be configured to receive only signals from the ground. In some embodiments, the body of the non-geostationary satellite 2 may act as a shield for the at least one antenna 21 against the legitimate GNSS signals originating from a higher orbit.

Figure 2A:
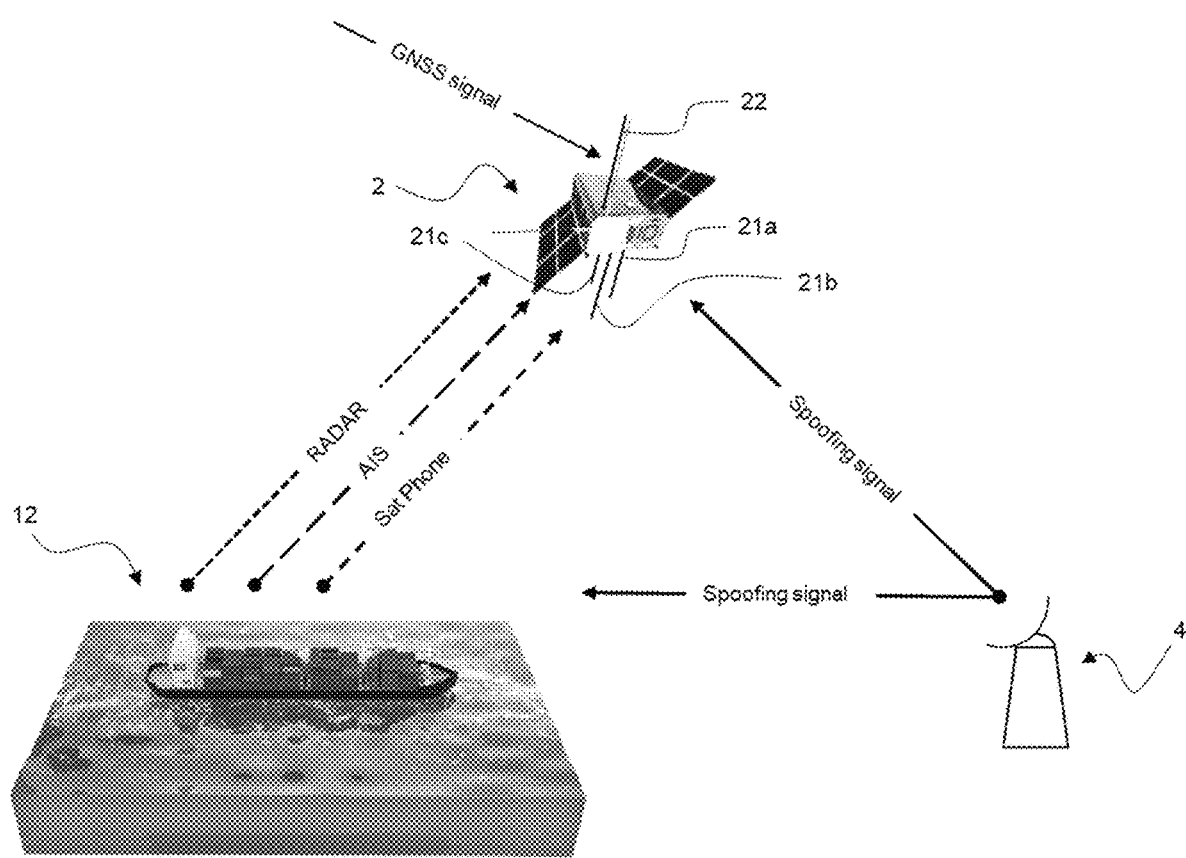
FIG. 2a is another example of a spoofing detection system based on a single non-geostationary satellite in combination with additional detection of other signals emitted by a vessel.

FIG. 2a shows another embodiment of the system shown in FIG. 1. In FIG. 2a, the non-geostationary satellite 2 has two additional antennas that are configured to receive signals from the ground, i.e., the antennas are located on the surface of the non-geostationary satellite 2 that is facing towards the ground. Further, the antennas 21a, 21b, and 21c may be directional antennas pointing towards nadir or the ground. These antennas can record several signals, which are emitted from a vessel 12, in this example a container ship. Antenna 21a corresponds to the at least one antenna 21 of FIG. 1 and is an L-band antenna. Thus, it is capable of detecting (spoofed) GNSS signals, as well as satellite phone service signals. Antenna 21b may be configured to receive AIS signals. Antenna 21c is configured to receive radar signals, including for example from the X band and S band. Although only one antenna, i.e. antenna 21c, is shown for the monitoring and recording of radar signals, in some embodiments, a plurality of antennas could be used.

As shown in FIG. 2a, the L-band antenna 21a can be used to monitor both satellite phone service signals and GNSS signals. The receiver of this antenna scans through a frequency range that covers the frequencies of the satellite phone service as well as of at least one GNSS service, such as Galileo or GPS. During the scanning, the receiver tunes to signals over a frequency range (e.g., around 50 MHz) that overlaps both the satellite phone service and GNSS service. Which frequency range or frequency band, e.g. for GNSS or sat phone signals, is monitored with one or more chunks is determined by a scan table or plan. Such a scan plan can be uploaded from the ground station 4 to the non-geostationary satellite 2 and is thus adaptable and can be for example prioritize the monitoring of either sat phone signals or GNSS signals or both simultaneously.

In some embodiments, two separate L-Band antennas and receivers for each signal type could be used (e.g., one for satellite phone service and one for GNSS). In one embodiment, the non-geostationary satellite 2 may also have a second L-band antenna, which is positioned like the at least one reference antenna on a surface of the satellite facing towards space. This second antenna enables recording of satellite phone service signals, which are downlink signals (i.e. signals that are sent from a satellite of the sat phone service to a handset/sat phone). With this downlink data, the different spot beams of different sat phone services at different locations of the non-geostationary satellite can be mapped. This allows a continuously updated self-mapping of the spot beams and their respective spot beam frequencies for the non-geostationary satellite orbit. This mapping is beneficial in that, depending on the position of the non-geostationary satellite, the respective L-band antenna receiver can tune faster to the correct frequency in order to catch sat phone signals. In other embodiments mapping can be provided from the ground station.

When a signal is caught within one frequency band that is used by a GNSS it also can be decoded like a respective GNSS signal in order to verify if the caught signal is a GNSS signal. If that is the case and the signal is coming from the ground, it is verified that the caught signal is a spoofing signal 41 since legitimate GNSS signals do not come from the ground. Further, by decoding the caught signal in such a manner, further information can be obtained, such as which satellite or satellites of a GNSS signal is/are spoofed. This analysis can be either done by the signal processing module or on the ground station after the signal that has been recorded have been transmitted.

Further, each of the received signals, such as radar AIS, sat phone as well as GNSS signals may be recorded separately. For the repetitive part of the sat phone, radar and GNSS signals, each cycle or pulse is assigned with the time of arrival and location of the non-geostationary satellite at this time of arrival. That is, the time of arrival and the location of the satellite is recorded and associated with the respective repetitive part. After that, this information is stored in a separate file for each signal type (GNSS, radar or sat phone). This operation can be done by the data collection module of the non-geostationary satellite 2.

When the recorded signals are transferred to the ground, the files comprising data recording for each signal type for a defined time range, such as one minute, are put together in one transfer file. The data, which is to be included in this transfer file, can depend on the request that is send to the satellite from the ground station beforehand. For example, if only AIS, radar, and GNSS data are requested, the transfer file does not include data related to sat phones. Other combinations of data are also possible.

The data provided from the non-geostationary satellite 2 to the ground station 8 can be used to keep track of vessels 12, such as ships of a shipping company. All data recorded with the non-geostationary satellite 2, which has a repetitive part and is emitted from a particular vessel 12, can be used to determine the geolocation of this particular vessel 12 (e.g., using the technique described below with respect to FIG. 3). Further, at the same time, from the recordings of ground-based GNSS signals (i.e. signals received at the at least one antenna 21 or the at least one L band antenna 21a, or spoofing signals 41), the geolocation of a spoofer 4 can be determined (e.g., using the technique described below with respect to FIG. 3). This additional information can be provided to shipping companies together with the positional information of the vessel 12 obtained, for example, from the radar signal so that the shipping company could warn respective ships in an area where spoofing signals 41 have been detected and that the GNSS, which they use, is spoofed and not to be relied upon. In some embodiments, signatures associated of the received radar AIS, sat phone, and/or GNSS signals may be determined as described below (see e.g., FIG. 3). In these embodiments, the signatures may be used by satellite 2 and/or the ground station 8 in FIG. 2b to determine the identity of the source of these signals (e.g., by looking up entities that are associated with the signatures).

Figure 2B:
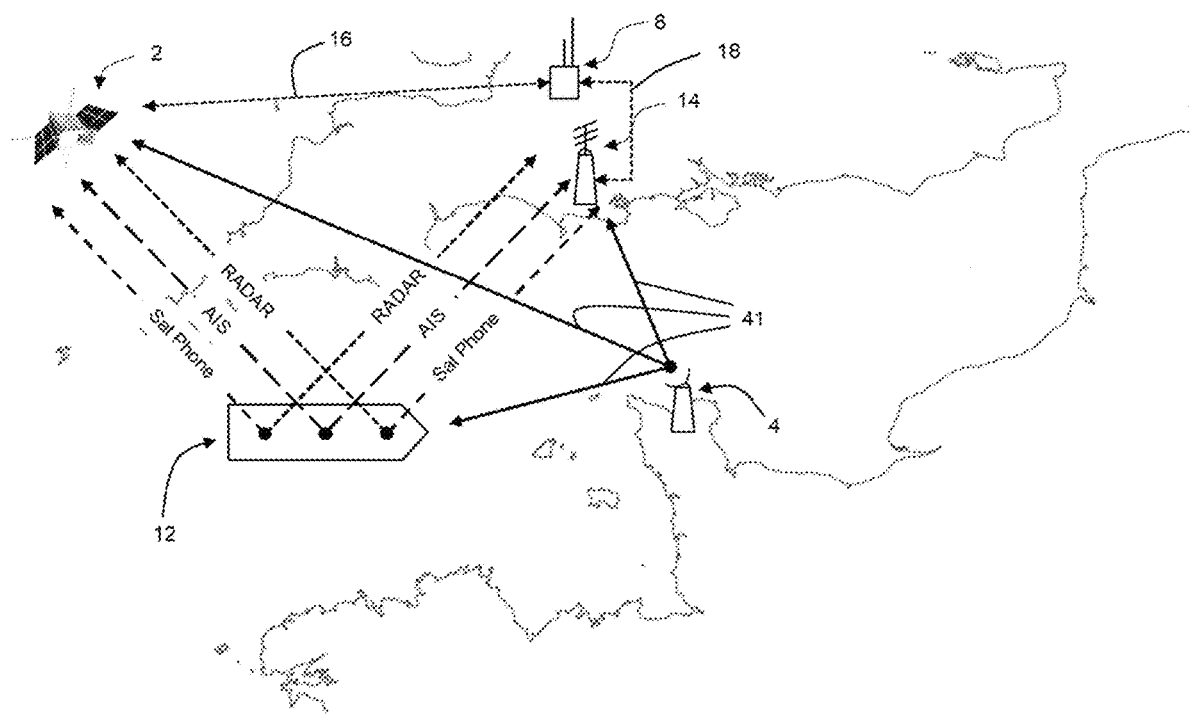
FIG. 2b is yet another example of a spoofing detection system supported by a ground-based detection station.

In FIG. 2b, the signals emitted by a vessel 12 can be monitored or recorded by a ground-based signal detection station 14. This station comprises of several receivers that are spaced apart by at least several meters, for example 3 to 5 m. The receivers are capable of collecting, with respective antennas, the same data that is recorded by the non-geostationary satellite 2 of FIG. 1 or FIG. 2a. However, since the ground-based signal detection stations do not move with respect to the earth's surface unlike satellite 2, a plurality of receivers is needed in order to perform a geolocation based on the repetitive part of radar or sat phone signals. In this case, triangulation and/or trilateration algorithms or the like can be applied. The ground-based system in FIG. 2b has a benefit of being able to monitor a certain area in real time. The ground-based signal detection station also can detect spoofing signals, not because of the antenna configuration that is given for the non-geostationary satellite 2, but because the position of each receiver/ground station is fixed and known. A simple comparison of the position calculation of the received GNSS signals with the non-position allows to determine if a spoofer signal is present. The geolocation of that spoofer 4, however, can be done in the same way as for the signals recoded with the non-geostationary satellite 2.

The non-geostationary satellite 2 as well as the ground-based signal detection station 14 are in frequent communication with the ground station 8, as schematically shown by the arrows 16 and 18 in FIG. 2b. The ground station 8 receives all the data packages, which are requested or send on the basis of a regular transmittance plan from the non-geostationary satellite 2 as well as from the ground-based signal detection station 14.

Further, data processing can be performed in this ground station 8. In the following the geolocation technique using a single moving non-geostationary satellite will be explained. This geolocation algorithm can be conducted on the ground station 8. However, also the data processing module of the non-geostationary satellite could perform at least steps of the following procedure. This geolocation method can be further applied not only to ground-based GNSS signals, i.e. spoofing signals, but also to radar pulses was sat phone signals or any other signal, which has a repetitive pattern or part that can be recorded with the non-geostationary satellite.

Figure 3:
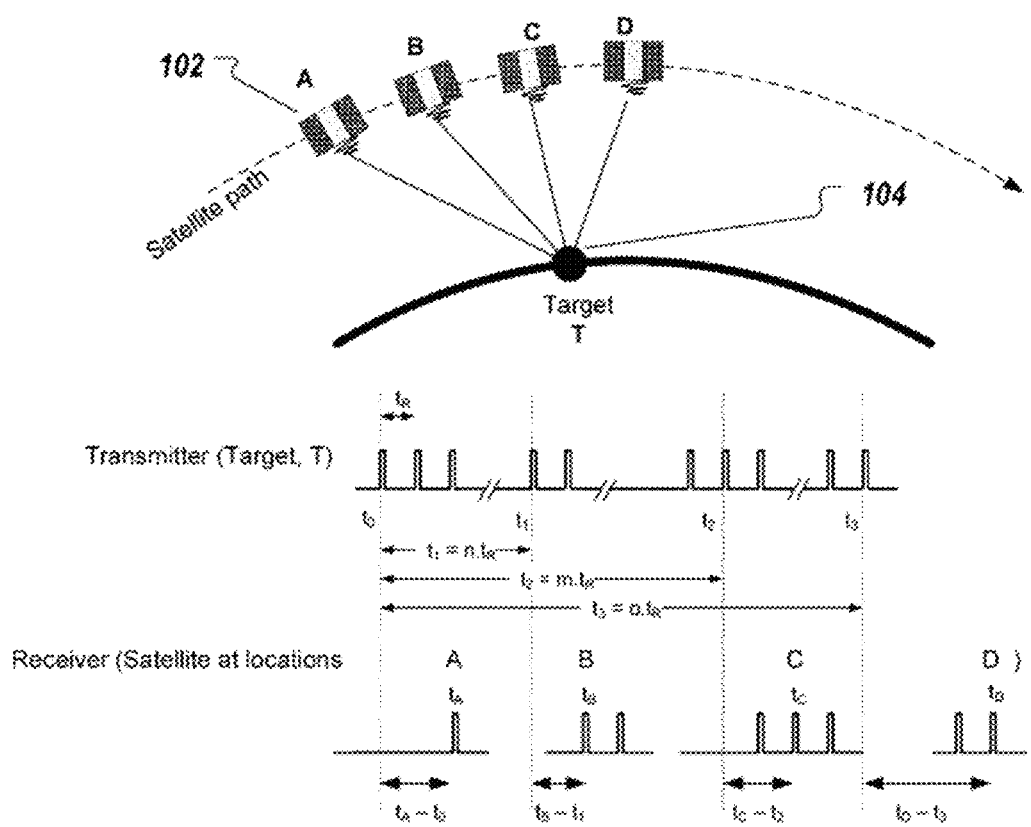
FIG. 3 shows an example of a technique for determining a geolocation of a spoofer signal using a single moving satellite.

FIG. 3 shows an example of a geolocation technique using a single moving satellite, such as satellite 2 in FIGS. 1, 2a, and 2b. Satellite 102 is a single non-geostationary satellite that operates and moves in a non-geostationary orbit. A non-geostationary satellite can travel in an orbit around the earth at a speed faster than the earth's rotation. FIG. 3 shows the satellite 102 traversing or moving along a known dotted satellite path from position A to B to C to D.

In this example, the satellite 102 includes one or more antennas and a receiver that can be configured to receive signals emitted in a frequency range of 30 MHz to 50 GHz. These one or more antennas are pointing to nadir or the ground and are thus configured to receive signal from the ground or earth surface. Specifically, in some embodiments, the at least one antenna and receiver of the satellite 102 can be configured to receive signals emitted in a frequency range of 2 GHz to 18 GHz or 1 to 2 GHz or below 1 GHz or combination thereof. Several signal sources operate at frequencies between 1 GHz and 2 GHz, as for example satellite navigation systems such as GPS, GLONASS, Galileo or BeiDou or satellite phone services. Some examples of a satellite 102 operating in a non-geostationary orbit include a CubeSat or a NanoSat. A CubeSat is a small form factor satellite that may include several systems to operate the CubeSat for variety of purposes. For instance, a CubeSat may include a power source, such as a battery and/or solar panels, a communication system (e.g., an antenna), and additional electronics (e.g., signal processors or sensors). A NanoSat may be smaller in size compared to a CubeSat and may include many of the systems included in the CubeSat.

Target location T represents a location of an earth-based spoofer or vessel 104, such as a ship, or a truck. The four lines drawn between the satellite 102, when it is at positions A, B, C, and D, and the earth-based spoofer or vessel 104, represent signals that are transmitted from a signal source operating on the earth-based spoofer or vessel 104 and that are received by the satellite 102. For example, the four lines can represent signals from a ship's signal source system signature. Additional signals that may be received in-between locations A, B, C, and D are omitted from FIG. 3 for the sake of clarity. The geolocation techniques described in this application can determine the target location T in three-dimensions.

The non-geostationary satellite 102 can be considered relatively fast (when compared to a speed of a relatively slowly moving vessel or stationary earth-based spoofer 104, which is a beneficial feature for determining geolocation. The large difference in speeds between a fast-moving non-geostationary satellite 102 and a relatively slowly moving or stationary earth-based vessel or spoofer 104 is beneficial, at least because the non-geostationary satellite 102 can receive multiple signals from the earth-based vessel or spoofer 104 whose relatively slow speed minimizes the errors in determining the spoofer or vessel 104's location. As further explained below, the information associated with multiple signals can be processed by a signal processing unit to locate a position or location of the earth-based spoofer or vessel 104, which is different from the conventional technique of correlating bearings.

In FIG. 3, the earth-based vessel or a spoofer 104 may be located at an unknown target location T on the earth's surface. The bottom half of FIG. 2 shows two related timing diagrams. The top timing diagram illustrates the Target (or earth-based spoofer or vessel 104) transmitting signals several times including at times $t_0$, $t_1$, $t_2$, $t_3$, etc., The difference between the signals transmitted by the spoofer or vessel 104 is shown as $t_R$. The time difference between to and $t_1$ can be described as $t_1 = n*t_R$, the time difference between $t_0$ and $t_2$ can be described as $t_2 = m*t_R$, and the time difference between $t_0$ and $t_3$ can be described as $t_3 = o*t_R$. The variables n, m, and o may be integer values.

In timing diagram example of FIG. 3, $t_R$ is constrained by the signal source on the spoofer or vessel 104 and can be a constant or may have an unknown value. In some cases where $t_R$ is irregular but deterministic, the location determination techniques described in FIG. 4 below can be used to determine location of the earth-based vessel or spoofer 104. For the case of a signal source, the repetition period $t_R$, is a signature of the signal source used by the vessel or spoofer 104. The transmit signals could be single or multiple depending on the signal sweep rate (rotation rate) or pulse repetition rate (PRR) of the multiple signals. The sweep rate, PRR and individual radio frequency (RF) signal pulse width are functions of a particular signal source set. Other signals with known or deterministic properties can also be received and processed to determine location of the earth-based spoofer or vessel.

The bottom timing diagram in FIG. 3 illustrates the satellite 102 receiving at least some of the signals transmitted by the earth-based vessel or spoofer 104 at satellite locations A, B, C, and D. For instance, the signals transmitted by the vessel or spoofer 104 at to is received by the satellite 102 at time of arrival $t_A$ and at satellite location A, the signal transmitted by the spoofer or vessel e 104 at $t_1$ is received by the satellite 102 at time of arrival $t_B$ and at satellite location B, and so on. The time differences $t_A-t_0$, $t_B-t_1$, and so on are the difference in time between when the transmitter transmits a signal and the receiver receives that same signal. The signals received at times $t_A$, $t_B$, $t_C$, $t_D$ need not be from consecutive transmitted signals.

The satellite 102 may include a Global Positioning System (GPS) device that provides information about positions A, B, C, and D of the satellite 102 when the satellite 102 received the signals from the earth-based spoofer or vessel 104. As further described in FIG. 3 below, a signal processing unit processes the signals received by the satellite 102 to determine a target location T in three dimensions.

Figure 4:
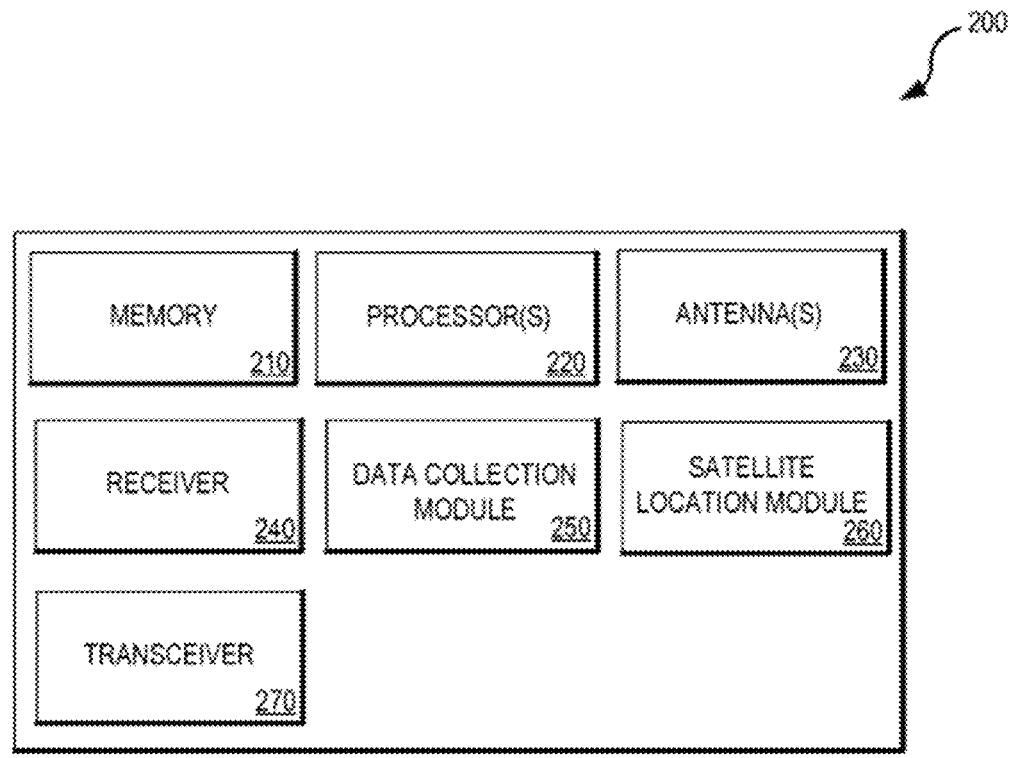
FIG. 4 is a block diagram of an example of a data collection module that receives and processes received signals.

FIG. 4 is a block diagram illustrating an example of a data collection module located on or in an non-geostationary satellite that may orbit in a non-geostationary orbit, such as in a LEO, MEO, HEO, or Molniya orbit. The data collection module 200 includes one or more processors 220 that can read code from the memory 210, and perform operations associated with the other blocks or modules shown in FIG. 4. The data collection module 200 includes one or more antennas 230 and a receiver 240 configured to receive the transmitted signals. For example, the receiver 240 can receive the signals at times $t_A$, $t_B$, $t_C$, $t_D$, etc., as mentioned in FIG. 2 while the non-geostationary satellite moves in between each received signal.

Based on the received signals, the data collection module 250 collects data associated with the received signals. For example, referring to the signal received by the data collection module 200 at position A in FIG. 2, the data collection module 250 obtains the time $t_A$ when the signal was received. The data collection module 250 also obtains information regarding the location of the non-geostationary satellite 102 at position A from a satellite location module 260 (e.g., GPS chip or a position location determination device, such as inertial guidance or derived from other externally provided positional information available to it). The satellite location module 260 can calculate satellite location from data or information available externally to the satellite. The satellite may, for example, have ephemeris data information uploaded to it from which the satellite location module 260 could calculate the satellite's position at the time of arrival of a signal. The satellite location module 260 can have information based on signal source location information (e.g., ground signal-source information) uploaded to it from which to calculate the satellite's position. The data collection module 205 also collects timing and satellite position data associated with each signal received at times $t_B$, $t_C$, and $t_D$, and any additional signals.

Figure 5:
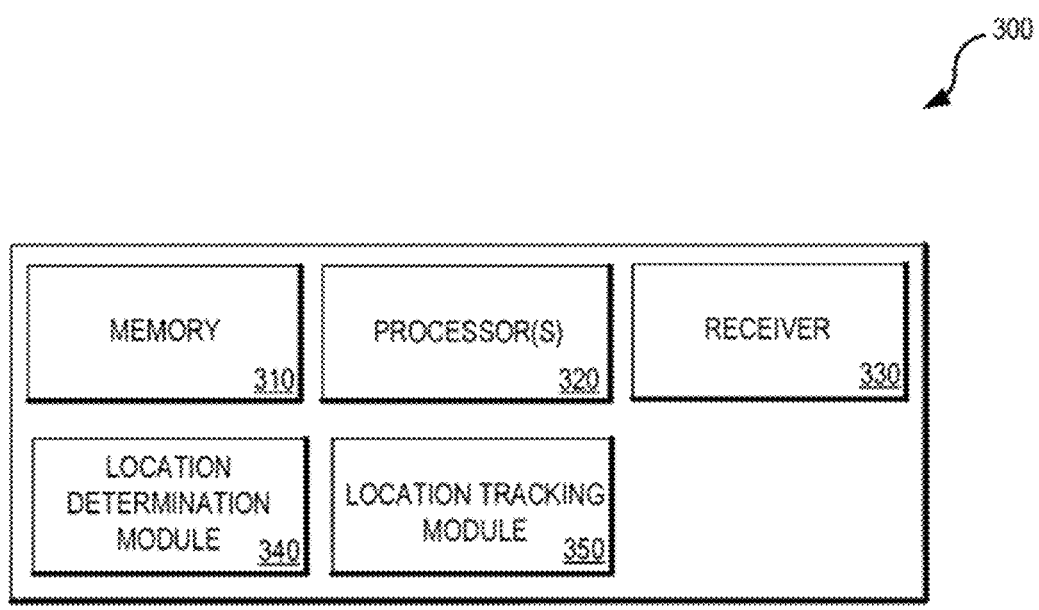
FIG. 5 shows a block diagram of an example of a signal processing unit that can determine a location of an earth-based vessel or spoofer.

The data collection module 200 also includes a transceiver 270 (or other receivers and transmitters) with which the satellite 102 can communicate with a stationary platform (e.g., ground-based computing device located on earth) or with a moving remote platform (e.g., an aircraft). The computing device can communicate to the satellite 102 via the transceiver 270 to instruct the data collection module 250 to collect data associated with the received signals (e.g., arrival times and/or position information of the satellite) or to send that data to the computing device. In some embodiments, the transceiver 270 can be combined with the receiver 240 (e.g., may be the same device) so that the transceiver 270 can perform the operations associated with the receiver 240. The data collection module 250 is configured to collect and/or send data associated with the received signals in response to receiving an instruction from the computing system located on a stationary platform (e.g., ground-based on the earth) or located on a remote moving platform (e.g., an aircraft). The computing device can send the data received from the data collection module 250 to a signal processing unit (as shown in FIG. 5) that can determine the location of the earth-based spoofer or vessel 104. The signal processing unit can be located in a stationary platform (e.g., the ground-based computing system on earth) or the signal processing unit can be located on or in a moving remote platform-based computing device. In some other embodiments, the satellite 102 can include a signal processing unit (as shown in FIG. 5) that can determine a location of the earth-based spoofer or vessel 104. In embodiments where the signal processing unit is included in the satellite 102, the determined location of the earth-based spoofer or vessel 104 is sent to the computing device in a stationary platform (e.g., a ground-based computing device located on earth) or in a moving remote platform.

FIG. 5 shows an example of a signal processing unit that can determine a location of an earth-based spoofer or vessel. The signal processing unit 300 may include one or more processors 320 that can read code from the memory 310, and perform operations associated with the other blocks or modules of the signal processing unit 300. In embodiments where the data collection module 200 and signal processing unit 300 are located on or in an non-geostationary satellite, the memory 210 and 310 may be the same and the processor (s) 330 and 330 may be the same.

The signal processing unit 300 includes a location determination module 340 that obtains signal timing (e.g., arrival time) and satellite position data from the data collection module 250. In embodiments where the signal processing unit 300 is located on a stationary platform (e.g., ground-based on the earth) or on a moving remote platform (e.g., an aircraft), the receiver 330 receives the signal timing and satellite position data from the data collection module 250. Based on the received timing and position data, the location determination module 340 determines the location of the earth-based spoofer or vessel 104 using the techniques described below.

The location determination module 340 can determine the location of the earth-based vessel or spoofer 104 based on the operations described below. A detailed explanation of the computations, relevant equations, and additional operations to determine location of the earth-based vessel or spoofer is described after the operations described below (and elsewhere in this patent document).

The location determination module 340 chooses a candidate location and determines a first set of path lengths between the candidate location and each satellite position data associated with a received signal (as explained in FIG. 3). For instance, the first set of path lengths may be obtained by determining a magnitude of the vector between the candidate location and each of the satellite position data.

The location determination module 340 also determines a second set of path lengths between a location of the earth-based vessel or spoofer 104 and each satellite position data. For instance, the second set of path lengths may be obtained by multiplying the speed of light with the arrival time of each signal.

Next, the location determination module 340 obtains two error values. The first error value (described as path length error value below) is obtained by comparing path lengths from the first set with the corresponding path lengths from the second set. The second error value (described as earth-radius error value below) is obtained by taking the difference between the radius of the earth known at the latitude and longitude associated with the candidate location and the magnitude of the radius of the candidate location determined from the same reference point, e.g., the center of the earth. The two error values are combined to obtain a total error that characterizes the proximity between the candidate location and the actual location of the earth-based vessel or spoofer 104.

The operations described above can be repeated by using additional candidate location values to obtain total error values corresponding to the additional candidate locations. The candidate location associated with the lowest total error is select as the best determine of the location of the earth-based vessel or spoofer 104.

Referring to FIG. 3, the values for variables to, $t_R$ and Target location T are unknown. In the timing diagram example shown in FIG. 3, the satellite 102 can obtain four measurements, for example, four satellite position and four arrival times related to the signals received at times $t_A$, $t_B$, $t_C$, $t_D$. Based on the satellite position and timing data, the location determination module 340 uses Equation (1) to determine target location T.

$$(|TD|-|TB|)-(|TC|-|TA|)=c\times[t_D-t_B-(t_C-t_A)] \quad \text{Equation (1)}$$

where "c" is the speed of light, |TA| is the magnitude of the vector TA, which is the path length or distance from T to A, |TB| is the magnitude of the vector TB, which is the path length from T to B, and so on. The variables n, m and o (as shown in FIG. 3) are integers that relate to the transmit times $t_1$, $t_2$, and $t_3$, respectively, from Target T. As mentioned above, the scenario in FIG. 2 shows that there are three unknown quantities: $t_0$, $t_R$, and target location T.

The location determination module 340 can eliminate $t_0$ and $t_R$ by an example algebraic manipulation as shown in Equation (1) below, leaving the target location T as the only unknown. Thus, in some embodiments, as explained for Equation (1), a signal processing unit 300 uses at least four received signals to solve for the target location T.

In some other embodiments, $t_0$ and $t_R$ can be eliminated using only three measurements, $t_A$, $t_B$ and $t_C$. Thus, Equation (1) becomes Equation (2) below.

$$(|TC|-|TB|)-(|TB|-|TA|)=c\times[t_C-2\cdot t_B+t_A] \quad \text{Equation (2)}$$

Thus, in some embodiments, as explained for Equation (2), a signal processing unit 300 uses at least three received signals to solve for the target location T.

A benefit of using Equation (1) to determine target location T is that Equation (1) can eliminate to and the repetition period, $t_R$ without knowing the values of $t_0$ and $t_R$. Similarly, Equation (2) can be used to determine target location T so that Equation (2) can eliminate to and the repetition period, $t_R$ without knowing the values of $t_0$ and $t_R$.

To determine a target location T in three dimensions, the location determination module 340 can select a candidate target location, T'. The candidate target location T' can be associated with a latitude, a longitude, a height at or above the surface of the earth. The latitude and longitude of T' may be based on a reference system known as World Geodetic System 1984 (WGS 1984). An example of an initial target height is sea level. Candidate target location T' can be selected based on a number of factors such as the range of elevation (e.g., 0 to 30 degrees) from the earth-based spoofer or vessel to the satellite that receives the signals, or the doppler frequency of the received signals.

Next, the location determination module 340 constructs a path length error function as shown in Equation (3) below for embodiments using at least four received signals. In some embodiments, the location determination module 340 constructs a path length error function as shown in Equation (4) below using at least three received signals.

$$|T'D|-|T'B|-(|T'C|-|T'A|)-c\times[t_D-t_B-(t_C-t_A)]=\varepsilon_p \quad \text{Equation (3)}$$

$$|T'C|-|T'B|-(|T'B|-|T'A|)-c\times[t_C-2t_B-t_A]=\varepsilon_p \quad \text{Equation (4)}$$

where $\varepsilon_p$ is a value that describes or represents the path length error, |T'A| is the magnitude of the vector T'A, which is the path length or distance from T' to A, |T'B| is the magnitude of the vector T'B, which is the path length from T' to B, and so on. As an example, |T'D| can be determined by converting the latitude and longitude of T' to geocentric cartesian coordinates (e.g., (x, y, z) which may be translated into <radius, latitude, longitude>), where T' is the vector (x, y, z). Similarly, the latitude and longitude of D obtained from GPS coordinates for example are converted to geocentric cartesian coordinates to obtain vector D. T'D is the vector between T' and D, and |T'D| is the magnitude or length of the vector that describes or represents the distance between T' and D.

As shown in Equations (3) and (4), the path length error value $\varepsilon_p$, is the difference between (i) the path lengths from a candidate location, T' to the locations of satellite (e.g., as calculated from the satellite's locations relative to candidate location T' at the observation time (e.g., |T'D|−|T'B|−(|T'C|−|T'A|) for Equation (3)) and (ii) the path length calculated from the time of arrival of the signals received from target location T (e.g., $c\times[t_D-t_B-(t_C-t_A)]$ for Equation (3)). The path lengths |T'A|, |T'B|, |T'C|, and/or |T'D| can be considered a set of path lengths between the candidate location T' and each position of the non-geostationary satellite. Furthermore, the path lengths ($c\times t_A$), ($c\times t_B$) or ($c\times 2t_B$), ($c\times t_C$), and/or ($c\times t_D$) can be considered another set of path lengths between the location of the earth-based spoofer or vessel and each position of the non-geostationary satellite.

Equation (3) is the same as Equation (5) shown below. Equations (3) and (5) can be solved by first determining for each satellite location (e.g. positions A, B, C, D) a difference between a path length associated with a candidate location T' and a path length associated with signals received from target location T (e.g., (|T'D|−$c\times t_D$), (|T'B|−$c\times t_B$), (|T'C|−$c\times t_C$), (|T'A|−$c\times t_A$)). Next, path length error value $\varepsilon_p$, is determined by subtracting the differences between the path lengths associated with positions B, C, and D and by adding the difference between the path length associated with position A.

$$(|T'D|-c\times t_D)-(|T'B|-c\times t_B)-(|T'C|-c\times t_C)+(|T'A|-c\times t_A) \\ =\varepsilon_p \quad \text{Equation (5)}$$

Similarly, Equation (4) is the same as Equation (6) shown below.

$$(|T'C|-c\times t_C)-(2|T'B|-c\times 2t_B)+(|T'A|-c\times t_A)=\varepsilon_p \quad \text{Equation (6)}$$

The location determination module 340 can minimize the path error value for Equations (5) or (6) by iterating candidate values of T' using Equation (8) as described below. By minimizing the path length error value, the location determination module 340 can determine the target location T in three dimensions.

Next, the location determination module 340 can use another error function to determine the target location T in a third dimension, such as height. Since the Target position, T, is constrained to be on or near to the earth surface, the location determination module 340 can construct an example earth-radius error function as shown below in Equation (7), where $\varepsilon_r$ is a value that describes or represents the earth-radius error, |T'| is the length of the vector T' can be determined from a reference point (0, 0, 0) in geocentric coordinates (i.e., center mass of earth). |T'| describes the magnitude of the radius of the candidate location T', which can be determined by taking the square root of the sum of the squares of the cartesian coordinates of T', i.e., square root ($x^2+y^2+z^2$). The earth-radius error value $\varepsilon_r$ can be the radial difference between the length of the vector T' and the earth's radius, $r_e$. The earth's radius $r_e$ is determined at the latitude and longitude location associated with candidate location T' (as given by, e.g., WGS-84) and can be determined from a reference point (0, 0, 0).

$$|T'|-r_e=\varepsilon_r \quad \text{Equation (7)}$$

Next, the location determination module 340 can combine the two sets of error quantities obtained from the path error and earth radius error function values in a mean squared error (MSE) form as shown in Equation (8).

$$mse = \varepsilon_p^2 + (k \times \varepsilon_r^2) \qquad \text{Equation (8)}$$

where k is a scale factor or a weighting value. In some embodiments, k may have a pre-determined value, such as 1. The MSE provides a value that can characterize the proximity or the closeness between the candidate location T' and the actual target location T. Thus, the MSE can quantify whether the candidate location T' is a good determine of the target location T. Thus, a low value for MSE indicates that the candidate location T' is close to the actual target location T.

The location determination module 340 can minimize the combined error quantities to determine a best determine of the target location T in three dimensions. The location determination module 340 can determine the best determine of target location, T, by iterating candidate values of T' and by using the set of measurements taken by the satellite for a spoofer or vessel located at target location T. For example, the location determination module 340 can repeat Equations (6) to (8) (or Equations (5), (7), and (8)) two times by using two different values of T' (e.g., a first T' and a second T') and by using the same set of measurements taken by the satellite for a spoofer or vessel located at target location T to provide a first MSE for the first T' and a second MSE for the second T'. In this example, the location determination module 340 can select either the first or the second T' that has the lowest MSE. In some embodiments, the location determination module 340 may iterate the candidate values of T' many times (e.g., four times) to provide a best determine of the target location T. In some example embodiments, the location determination module 340 may iterate candidate values of T' to determine of Target location, T by using a minimization technique such as a Down Hill Simplex method.

The signal processing unit 300 may include a location tracking module 350 that can store the candidate location T' that best determines the target location T of the earth-based spoofer or vessel determined by the location determination module 340. A benefit of storing the best determine of the target location T is that it can provide a history of the determined location(s) of the earth-based spoofer or vessel. A ground-based or remote platform-based computing device may use the location history of the earth-based spoofer or vessel to plot a map that shows the various locations of the earth-based spoofer or vessel at different times.

In some embodiments, to enhance the accuracy of the determine of the target location T, the location determination module 340 can repeat the operations described above in the context of Equations (1) to (8) using additional position and timing measurements that may be obtained by the satellite in sequence. As explained above, a location determination module 340 can use the four measurements described in FIG. 3 (related to satellite locations A, B, C, and D) to determine a target location T. In some cases, the satellite 102 may receive additional signals from spoofer or vessel 104 at additional satellite locations E, F, G, H (not shown in FIG. 3). In such cases, the determine of the target location T can be improved by using information associated with the additional signals. For example, the location determination module 340 can use the four measurements related to satellite location B, C, D, and E to obtain another determine of the target location T. In another example, the location determination module 340 can use the four measurements related to satellite location E, F, G, and H to obtain another determine of the target location T.

The disclosed techniques can be used to determine a location of an earth-based spoofer or vessel (e.g., boat, ship, truck or station) based on timing and position measurement data associated with signals received by a receiver on a non-geostationary satellite. For example, based on the signals transmitted by a signal source on a spoofer or vessel, the location determination module 340 can determine a location of the ship from which the signal source is operating. In some embodiments, the techniques described in this patent document can be extended to a multi-satellite system involving multiple non-geostationary satellites. Since a satellite moves fast compared to a slowly moving earth-based spoofer or vessel, a single satellite travelling around the earth cannot receive signals from a spoofer or vessel located on the earth at all times. In a multi-satellite system, each non-geostationary satellite can be configured to obtain multiple measurement data as described in this patent document. Each non-geostationary satellite can orbit the earth at some distance from another non-geostationary satellite so that the multiple satellites can form multiple rings of moving satellites orbiting the earth. The location determination module 340 of the signal processing unit can obtain the multiple measurement data from each satellite to determine location of an earth-based spoofer or vessel operating a signal source. A benefit of the multi-satellite system is that it can allow a signal processing unit to continuously determine the location of a moving or stationary earth-based spoofer or vessel operating a EM source.

Figure 6:
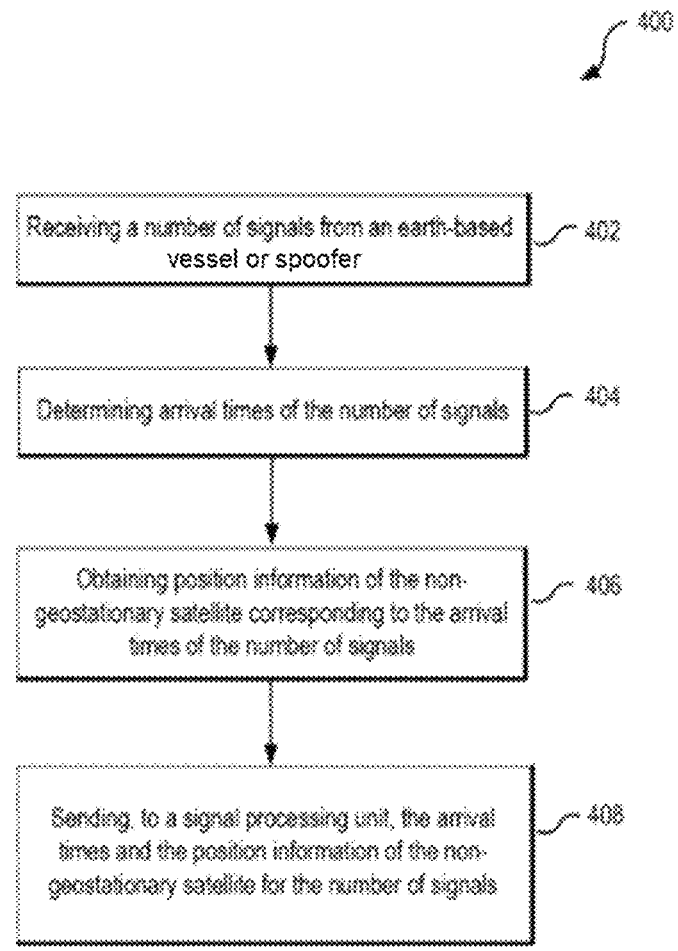
FIG. 6 shows an example flow diagram for receiving and processing received signals.

FIG. 6 shows an example flow diagram for receiving and processing signals by a data collection module. At the receiving operation 402, a data collection module on a non-geostationary satellite receives a number of signals from an earth-based vessel or spoofer. The non-geostationary satellite may orbit earth in a non-geostationary orbit, such as in a LEO, MEO, HEO, or Molniya orbit. In some embodiments, the number of signals is at least three.

For each received signal, such as radar, AIS, GNSS or sat phone signal, the data collection module determines an arrival time and a position information of the non-geostationary satellite. At the determining operation 404, the data collection module determines arrival times of the number of signals. At the obtaining operation 406, the data collection module obtains position information of the non-geostationary satellite corresponding to the arrival times of the number of signals. The determining operation 404 and the obtaining operation 406 may be performed after each signal has been received. In some embodiments, the position information of the non-geostationary satellite is obtained from a GNSS device, such as GPS Galileo or GLONASS, located on the non-geostationary satellite. This device may be connected with at least one reference antenna.

At the sending operation 408, the data collection module sends, to a signal processing unit, the arrival times and the position information of the non-geostationary satellite for the number of signals. In some embodiments, the data collection module may send each arrival time and position information to a signal processing unit as the data collection module receives and processes each signal. In some other embodiments, the data collection module may send a group of arrival times and position information (e.g., a set of 3 or 4 of arrival times and a set of 3 or 4 position information) to a signal processing unit after the data collection module receives and processes a number of signals (e.g., 3 or 4). In some embodiments, the data processing apparatus is configured to perform the determining operation 404, the obtaining operation 406, or the sending operation 408 in response to receiving an instruction from a ground-based or remote platform-based computing system.

In some embodiments, the data collection module may include a processor and a memory that may include instructions stored thereupon. The instructions upon execution by the processor configure the data collection module to perform the operations described in FIGS. 4 and 6 and in the embodiments described in this patent document.

Figure 7:
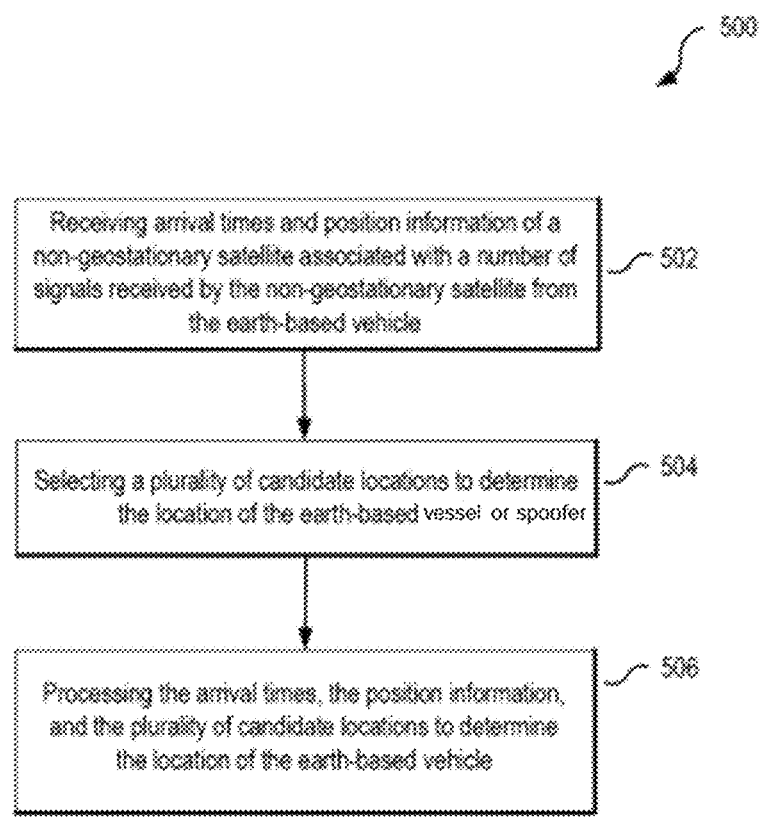
FIG. 7 shows an example flow diagram for determining a location of origin of an earth-based satellite navigation system

FIG. 7 shows an example flow diagram for determining a location of an earth-based vessel or spoofer by a signal processing unit. At the receiving operation 502, the signal processing unit receives arrival times and position information of a non-geostationary satellite associated with a number of signals, such as radar, AIS or sat phone signals received by the non-geostationary satellite from the earth-based vessel or in case of the spoofer the non-legitimate GNSS or GNSS-like signals. In some embodiments, the signal processing unit is located in a ground-based or in a remote platform-based computing system.

At the selecting operation 504, the signal processing unit selects a plurality of candidate locations (e.g., four candidate locations) to determine the location of the earth-based vessel or spoofer.

At the processing operation 506, the signal processing unit processes the arrival times, the position information, and the plurality of candidate locations to determine the location of the earth-based vessel or spoofer. The processing of the arrival times, position information, and candidate locations can be performed by determining, for each candidate location and based on the arrival times and the position information, an error value that describes or represents a proximity between a candidate location and the location of the earth-based vessel or spoofer. In some embodiments, the error value is determined for each candidate location by the signal processing unit configured to:
  (i) determine a first set of path lengths between the candidate location and each position information of the non-geostationary satellite,
  (ii) determine a second set of path lengths between the location of the earth-based vessel or spoofer and each position information of the non-geostationary satellite,
  (iii) obtain a first error value based on differences between path lengths from the first set of path lengths and corresponding path lengths from the second set of path lengths for each position information of the non-geostationary satellite,
  (iv) obtain a second error value based on a difference between earth's radius at a latitude and a longitude associated with the candidate location and a magnitude of the candidate location's radius, where the earth radius and the magnitude of the candidate location's radius are determined from a same reference point, and
  (v) determine the error value by combining the first error value and the second error value.

In some embodiments, the first set of path lengths are determined by the signal processing unit configured to calculate a magnitude of a vector between the candidate location and each position information of the non-geostationary satellite. In some embodiments, the second set of path lengths are determined by the signal processing unit configured to multiply a speed of light by each arrival time of the number of signals, where the number of signals, such as radar, AIS or GNSS signals are received from the location of the earth-based vessel or spoofer.

In some embodiments, the first error value is obtained by the signal processing unit configured to use a linear combination of the differences between path lengths from the first set of path lengths and corresponding path lengths from the second set of path lengths for each position information of the non-geostationary satellite. In some embodiments, the error value is determined by the signal processing unit configured to: multiply a pre-determined value by the second error value raised to a power of two to obtain a first value, and add the first value to the first error value raised to a power of two to obtain the error value.

After the processing operation, the signal processing unit selects, from the plurality of candidate locations associated with a plurality of error values, one candidate location having a lowest error value, where the selected candidate location is the determine of the location of the earth-based vessel or spoofer. In some embodiments, the selected candidate location provides the determine of the location of the earth-based vessel or spoofer in three-dimensions. In some embodiments, the signal processing unit is further configured to store the selected candidate location for the earth-based vessel or spoofer.

In some embodiments, the signal processing unit may include a processor and a memory that may include instructions stored thereupon. The instructions upon execution by the processor configure the signal processing unit to perform the operations described in FIGS. 5 and 7 and in the embodiments described in this patent document.

In some embodiments, the signal processing unit may be further configured to correlate the calculated geolocations of different cyclic types, which can be emitted by a vessel, for example radar, AIS or sat phone signals. Such correlation has the advantage that shipping companies, which want to monitor their vessels, are able to track these vessels even when a spoofing signal is present in a certain area. Further, a vessel can be warned, when it comes near or enters an area, where spoofing signals have been detected.

The correlation of location data, especially obtained from radar and AIS signals on the one hand and on the other hand sat phone signals allows to monitor the association of a sat phone to a particular vessel. This may enable the location of the vessel with the sat phone data, even if its own systems such as radar or AIS are damaged, malfunctioned or deactivated.

The correlation of the geolocation data received from different signals can be done or supported by machine learning methods, such as principal component analysis (PCA), support vector machines, artificial neural networks or the like. Such algorithms further allows, based on previously monitored and correlated or analyzed location data of different signal sources, to predict distortion events that affect some of the vessels systems on travel routes. Such distortion events could be for example the presence of a spoofer or jammer that can affect the correct functioning of the geolocation determination by a GNSS or the radar, AIS or sat phone services of a vessel.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., non-volatile solid state storage drives, magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the disclosure disclosed in the foregoing description, in the drawings and in the claims can be essential both individually and in any combination for the implementation of the disclosure in its various embodiments.

What is claimed is:

1. A ground station system for detecting a Global Navigation Satellite System (GNSS) spoof signal, configured for receiving communications from a detection satellite, wherein the detection satellite: (1) is on a first orbit that is lower than a second orbit used by a GNSS satellite and (2) includes:
   a first antenna positioned to receive signals originating from a planetary surface, wherein the first antenna is capable of receiving signals in a frequency range used by the GNSS spoof signal,
   a second antenna positioned to receive signals originating from the GNSS satellite on a higher orbit than the first orbit of the detection satellite, wherein the second antenna is capable of receiving signals in a frequency range used by the GNSS satellite,
   one or more processors configured to:
      receive GNSS signals of a first type emitted from the surface via the first antenna,
      receive GNSS signals of a second type emitted by the GNSS satellite via the second antenna,
      determine, based on the received GNSS signals of a second type, a position of the detection satellite when the GNSS signals of the first type are received at the detection satellite, and
      determine times of arrival associated with received GNSS signals of the first type, and a transmitter configured to transmit, to the ground station system, the positions of the detection satellite and the respective times of arrival; and the ground station comprising: one or more processors configured to determine, using the times of arrival and the positions of the detection satellite included in the collected data, a geolocation of a source of the first type of GNSS signals received at the first antenna of the detection satellite, wherein the processors included in the ground station are further configured to identify a repetitive part of the first type signals, and the data collected by the detection satellite includes a recording of the repetitive part.

2. The system of claim 1, wherein the first antenna is further capable of receiving signals in at least one frequency range used by a non-GNSS signal.

3. The system of claim 2, wherein the processors included in the ground station system are further configured to receive the non-GNSS signal and determine a signature associated with the non-GNSS signal.

4. The system of claim 3, wherein the processors included in the ground station system are further configured to identify a signal source associated with the signature and using the identified signal source to determine an identity associated with the source of the non-GNSS signal.

5. The system of claim 2, wherein the non-GNSS signal is a radar signal, satellite phone service signal, or an automatic identification system (AIS) signal.

6. The system of claim 1, wherein a body of the detection satellite is interposed between the first and second antenna, and the body is configured to shield the second antenna from signals originating from the planetary surface.

7. The system of claim 2, wherein the processors included in the detection satellite are further configured to receive the non-GNSS signal and determine a signature associated with the non-GNSS signal.

8. A method for detecting a Global Navigation Satellite System (GNSS) spoof signal by a ground station in communication with a detection satellite that: (1) is on a first orbit that is lower than a second orbit used by a GNSS satellite and (2) includes:

a first antenna positioned to receive signals originating from a planetary surface, wherein the first antenna is capable of receiving signals in a frequency range used by the GNSS spoof signal, a second antenna positioned to receive signals originating from the GNSS satellite on a higher orbit than the first orbit of the detection satellite, wherein the second antenna is capable of receiving signals in a frequency range used by the GNSS satellite, one or more processors configured to:
receive GNSS signals of a first type emitted from the surface via the first antenna,
receive GNSS signals of a second type emitted by the GNSS satellite via the second antenna,
determine, based on the received GNSS signals of a second type, a position of the detection satellite when the first type of GNSS signal is received at the detection satellite, and
determine times of arrival associated with received GNSS signals of the first type of GNSS signal, and
a transmitter configured to transmit, to the ground station system, the positions of the detection satellite and the respective times of arrival;

the method comprising:

identifying a repetitive part of the GNSS signals of the first type, and the data collected by the detection satellite includes a recording of the repetitive part; and determining, using the times of arrival and the respective positions of the detection satellite included in the collected data, a geolocation of a source of the GNSS signals of the first type received at the first antenna of the detection satellite, by obtaining at least three measurements of satellite positions and arrival times related to the signals received at different times and performing comparisons based on determined distances between the detection satellite and candidate locations for the source.

9. The method of claim 8, wherein the first antenna is further capable of receiving signals in at least one frequency range used by a non-GNSS signal.

10. The method of claim 9, further comprising receiving the non-GNSS signal and determine a signature associated with the non-GNSS signal.

11. The method of claim 10, further comprising identifying a signal source associated with the signature and using the identified signal source to determine an identity associated with the source of the non-GNSS signal.

12. The method of claim 9, wherein the non-GNSS signal is a radar signal, satellite phone service signal, or an automatic identification system (AIS) signal.

13. The method of claim 8, wherein a body of the detection satellite is interposed between the first and second antenna, and the body is configured to shield the second antenna from signals originating from the planetary surface.

14. The method of claim 9, wherein the processors included in the detection satellite are further configured to receive the non-GNSS signal and determine a signature associated with the non-GNSS signal.

* * * * *